Patented Sept. 24, 1940

2,215,878

UNITED STATES PATENT OFFICE 2,215,878

PROMOTING PLANT GROWTH

Cecil Early Johnson, New York, N. Y., assignor to International Cigar Machinery Company, a corporation of New Jersey No Drawing. Application August 26, 1937, Serial No. 161,026

9 Claims. (Cl. 47—58)

This invention relates to the promotion of plant growth, and more particularly to improvements in tobacco culture, although the improvements may be utilized in any field for which they are adapted by their nature.

The present invention aims to provide a fertilizer containing certain elements which are necessary in small quantities as plant nutrients to give proper growth and development to the plant.

Generally speaking, present fertilizer practice recognizes two distinct primary functions which may be performed by added substances. They may either furnish plant food such as nitrogen, phosphate, and potash, or they may modify soil conditions such as texture, acidity or alkalinity.

There are secondary factors which may exert a profound influence on plant quality. The value of the plant food as it lies in the soil may be influenced by adsorption, diffusion and other more obscure, though none the less important, colloidal processes which are promoted by catalytic agencies; or the utilization and metabolism of the food elements after they have been taken into the plant may be affected by the presence of minute traces of catalytic elements. These secondary factors form the principal basis of the present invention, though it is by no means certain that some of the fertilizing elements added with the intention of furnishing catalytic stimulus have not at the same time furnished primary plant food, and hence I do not wish to be confined to any particular theory as to the cause of the improved growth.

An object of the invention is to produce tobacco in which the plant structure is of superior height, the leaves are of greater spread, and the quality of the leaves is enhanced in color, and in aroma when consumed, while the tobacco possesses in general to an unusual degree, the other characteristics which make for a marketable product, notably in the fabrication of cigars and cigarettes.

In pursuance of the above general object, a specific object of the invention is to supply to the growing tobacco plant a suitable quantity of lithium and/or manganese, which, while small in volume relatively to that of conventional soil fertilizer components relied upon by growers in the tobacco fields where the best tobacco has its origin, is, nevertheless, unexpectedly effective in improving the growth and quality of the plant, even over results produced by the best fertilizer practice hitherto known.

As the result of extended research and experimentation, I have discovered that while the other elements identified as constituents of tobacco may exist therein in larger proportions than that of lithium, nevertheless a relatively small addition of lithium, particularly when combined with manganese, effects, to an unexpected degree, an improvement, both qualitative and quantitative, in the height, in the leaf-spread, and in the other attributes of the plant and its products which make for greater value and smoking quality, as compared with the small effects of like character attained by the addition of much larger proportions of the other known constituents of the tobacco plant, supplied to the plant for the same purpose.

In fact, while my observations lead to the conclusion that the addition of some other elements contributes nothing to the desired improvement in size and quality of the tobacco leaf, beyond the expected ordinary results of intensive fertilization; per contra, when a small but adequate quantity of suitable lithium or lithium manganese mixture is made available in the soil circumjacent to the root of the tobacco plant, there will result an optimum growth and development of the plant.

I have found that lithium and manganese together are even more effective than lithium alone, and that these elements, in combination, exercise a beneficial effect which has been documented in the course of my extensive laboratory and field investigations. Hence preferably lithium is used with a manganese inclusion when supplied to plants as a supplementary fertilizer.

The evaluation of the quality of tobacco is a complex matter because so many different factors must be considered in classifying and grading the tobacco. Aside from the more important factors of burn, aroma and taste, consideration must be given to prominence of veins, grain, texture, body, spread, elasticity, heel and tip characteristics, and color in the case of the wrapper tobacco.

In order to obtain a true measure of these various factors in determining the quality of tobaccos produced in my experimental plots, I employed experienced graders whom I felt would be the most competent judges of the tobacco.

Since the quality of a particular tobacco is difficult to carry in mind from plot to plot, tobacco was grown on control plots, without treatment with the supplementary fertilizer, for comparison with tobacco produced on plots where the supplementary fertilizer was used. This made quality evaluation more accurate as even slight variations could be noted.

By the above test methods, the tobaccos grown with this supplementary fertilizer were definitely found to be improved in quality and in many cases the yield was increased as, for example, in the case of the wrapper tobacco where an increased spread of the leaf was obtained. Increase in the height of filler tobacco plants was obtained by the treatment.

In these field tests, filler and wrapper tobaccos were supplied with lithium and manganese compounds, admixed, as supplementary fertilizers; in some cases the supplementary fertilizer being supplied to the tobacco in a mixture with conventional fertilizers employed by the farmers in growing tobacco, before planting. In other cases I applied the lithium-manganese fertilizer around the growing plants.

In further field tests I applied the lithium compounds alone in the form of lithium carbonate, lithium sulfate, lepidolite, amblygonite, or spodumene, with marked beneficial results.

I have found by actual practice that use may be made with great advantage for the intended purpose, of lithium compounds such as lithium carbonate, $(Li_2CO_3)$; lithium sulfate, $(Li_2SO_4)$; amblygonite $(AlPO_4.LiF)$ a lithium phosphate mineral; spodumene $(Li_2O.Al_2O_3.4SiO_2)$ and lepidolite $KLi[Al(OH,F)_2] Al(SiO_3)_3$, these latter being lithium silicate minerals. Results of outstanding importance have been attained also when, in development of the fertilizer, I have mixed, with the lithium compound, manganese compounds, such as manganic oxide $(Mn_2O_3)$; manganese dioxide $(MnO_2)$; manganese hydroxide $(Mn(OH)_2)$; manganic hydroxide $(Mn_2O_3H_2O)$; manganese sulphate $(MnSO_4)$ absorbed in silica gel; manganese-oxyhydroxide $(MnOOH)$ absorbed in silica gel; and rhodonite $(MnO_2.SiO_2)$ a manganese silicate.

The above are given merely as examples of components found to be satisfactory in making up the novel composition of matter used in carrying the present invention into effect; so that those familiar with the art of tobacco culture can arrive at a clear picture of the fertilizer. These illustrative examples are in no sense to be understood as limitative, however, and may be varied in arrangement and proportions at will, to secure results found to suit different soils and plants.

From the examination and classification of the tobacco experiments repeated over a period of several years of investigation and study, I have found that an addition of approximately 0.15 gram of lithium, (computed as Li) per plant will prove adequate to secure the described improvement in growth and accompanying desirable leaf characteristics; also that this improvement is favored and enhanced by the combination with the lithium component of approximately 0.60 gram of manganese (computed as Mn); also that an increased concentration may be supplied to advantage according to the needs of a particular soil.

In seeking for a lithium compound which would be most satisfactory commercially, it was desirable to find one which would not be too soluble and thus too readily washed away by rain and yet be sufficiently soluble to give up its lithium at a rate satisfactory for assimilation by the plant. Minerals of lithium were tested, and it was found that by grinding certain of them to an impalpable powder the lithium could be extracted from the mineral by buffered solutions the equivalent of the humic acids of the soils. Lepidolite, ground to an impalpable powder was found to be a particularly good source of lithium for fertilizing purposes under these conditions.

By way of example, the invention may be carried into effect, as follows:

*Example I.*—140 to 150 pounds of amblygonite per acre may be used, to which may be added 30 pounds per acre of manganese hydroxide;

*Example II.*—200–300 pounds per acre of lepidolite may be used, with or without the addition per acre of 30–50 pounds of manganese hydroxide or other hydrated oxides of manganese.

*Example III.*—Lepidolite ground to an impalpable powder in quantities from 200 to 300 pounds per acre.

*Example IV.*—Spodumene ground to an impalpable powder in quantities from 100 to 200 pounds per acre.

Valuable results may also be obtained with amounts varying widely from the above.

In practice, these materials can be mixed readily with fertilizers supplying other needed elements in larger quantities; as for example, any of the fertilizing materials to which reference has already been made, or several or all of them in suitable instances; or the mixture as such may be distributed over the cultivated land.

It should be noted that I have found it desirable to use the lithium and the manganese in a form which will not be washed away easily by rain. For example, the above oxides and hydroxides of manganese are only slightly soluble in water, but in the presence of humic acids in the soil these compounds supply manganese in low concentration to the plant roots.

Similarly I have found that amblygonite, lepidolite or spodumene, while only slightly soluble in water, is capable, in the presence of soil acids, of supplying to plant roots the necessary amount of lithium in excess over that available to the plant root without the said lithium compound, even where unusually large quantities of other fertilizer components are used.

With respect to the provision of a relatively insoluble lithium compound, it will be understood that use is made of amblygonite, lepidolite or spodumene primarily because they have in common this relatively insoluble characteristic, and I have observed that such use is more satisfactory than that of a more soluble source of lithium, for the following reasons:

(1) Its capacity for staying in the soil near the plant roots without being washed away, as more soluble compounds will be:

(2) By reason of its lower cost, since the more soluble compounds are derived, by manufacture, from the materials which can be used directly as fertilizer in the manner herein disclosed, and for the first time made possible by the present invention.

It is to be understood, however, that any theoretical statement herein contained, is advanced merely by way of helpful explanation, and not as of the essence of the present disclosure of the invention, for the success of which, as herein set forth, other theories may be found to afford satisfactory explanation of the results achieved by the practice I have detailed.

It is to be noted further that the novel method and composition of matter herein disclosed can be used to advantage in promoting the growth of plants other than the tobacco plant.

The method above described and exemplified may be widely varied within the scope of the claims, inasmuch as the specific statements of method selected to illustrate the invention are but certain of many possible embodiments of the same. The invention, therefore, is not to be restricted to the details described nor to the particular embodiments chosen as illustrative of the invention.

What is claimed is:

1. A fertilizer containing a lithium compound in combination with at least one of the group of oxides which consists of manganese dioxide, manganic oxide, and hydrated forms of these oxides, the co-active lithium-manganese composition to be suitable for use both separately and with other plant foods.

2. A fertilizer comprising a lithium mineral of the group which consists of lepidolite, amblygonite and spodumene, admixed with oxides, including hydrated oxides of manganese, the combination to be used to supply the elements lithium and manganese co-actively to plants, particularly to tobacco and allied growths.

3. The method of promoting the growth of plants such as tobacco, said method consisting in supplying to the plant at least one member of the group which consists of lepidolite, amblygonite and spodumene, in combination with at least one member of the group which consists of an oxide of manganese and a hydrated oxide of manganese, the combination to be used to supply specifically the elements lithium and manganese co-actively to tobacco and allied growths, in exclusively nutritive quantities.

4. The method of promoting the growth of tobacco plants and the like which comprises adding to the soil approximately 100 to 300 pounds of amblygonite per acre.

5. The method of promoting the growth of tobacco plants and the like which comprises adding to the soil approximately 100 to 200 pounds of spodumene per acre.

6. The method of promoting the growth of tobacco plants and the like, said method consisting in applying a lithium mineral of the class described, ground to an impalpable powder, and in an exclusively nutritive quantity sufficient to supply not less than approximately 0.15 gram of lithium per plant, computed as Li; the above to be admixed with at least one of the group which consists of manganese dioxide, manganic oxide, manganese hydroxide and rhodonite, the manganese compound or mineral to be in an exclusively nutritive quantity sufficient to supply not less than approximately 0.60 gram of manganese per plant.

7. The method of promoting the growth of tobacco plants and the like which comprises adding to the soil approximately 100 pounds to 200 pounds of amblygonite per acre, in co-active combination with approximately 30 to 100 pounds of manganese hydroxide per acre.

8. The method of promoting the growth of tobacco plants and the like, said method consisting in adding to the soil in which said plants are cultivated approximately from 200 to 300 pounds of lepidolite per acre, in co-active combination with a hydrated oxide of manganese to the amount of approximately 30 to 50 pounds per acre.

9. The method of promoting the growth of tobacco plants and the like, said method consisting in adding to the soil in which said plants are cultivated approximately from 200 to 300 pounds of lepidolite per acre, combined with manganese oxyhydroxide adsorbed in silica gel to the amount of approximately 30 to 50 pounds per acre.

CECIL EARLY JOHNSON.